J. D. ROSS.
CAR-COUPLING.
No. 190,984. Patented May 22, 1877.
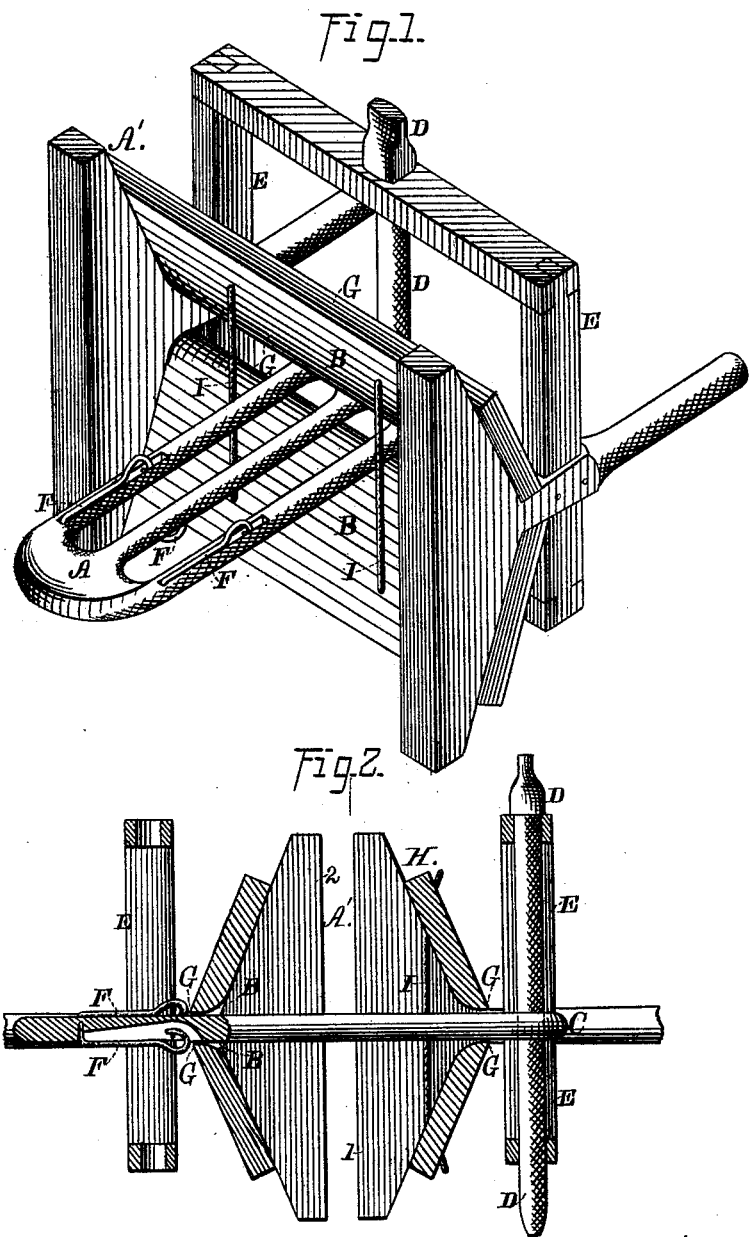

UNITED STATES PATENT OFFICE.

JOHN D. ROSS, OF MACON, GEORGIA.

IMPROVEMENT IN CAR-COUPLINGS.

Specification forming part of Letters Patent No. 190,984, dated May 22, 1877; application filed February 13, 1877.

*To all whom it may concern:*

Be it known that I, JOHN D. ROSS, of Macon, in the county of Bibb and State of Georgia, have invented a new and useful Device for Connecting or Coupling Railroad-Cars, and of which the following is a full, clear, and exact description, reference being had to the accompanying drawings, and to the letters of reference marked thereon, which form a part of this specification, and in which—

Figure 1 is a perspective view of my invention, and Fig. 2 a vertical longitudinal section thereof.

My invention relates to improvements in car-couplings, whereby the same may be automatically coupled together without necessitating an attendant passing between or under the cars for the purpose of operating or guiding any of the parts of the device, the nature of which will be hereinafter explained and pointed out in the claims.

Referring to the drawings, A' represents the draw-head, constructed of cast metal, and composed of the vertical sides and inclined central parts B B, so arranged that a narrow opening is left between the central parts or jaws for the insertion of the flat link A, as shown in Fig. 1.

The flat link A is provided at one end with an opening, C, for the introduction of the coupling-pin D, while the opposite end of the link is provided with steel springs F F F, secured in suitable grooves in the link, and with one end projecting up, as shown.

In the operation of my improved device the link A is pushed through the jaws or central parts B B, and secured in place by the coupling-pin D passing through the opening C of the link and the openings E E in the frame at the rear of the draw-head.

The link A is held in the proper line or position for engaging with the opposite draw-head by means of the rods I I, (shown in Fig. 1,) and in the operation of which the draw-heads 1 and 2 are brought or pushed together, thereby forcing the end of the link A through the opening between the two parts B B, compressing the springs F F F until they have passed through, when, the pressure being withdrawn, the springs return to their natural position, and catch against the edges G G of the parts or jaws B B, thereby securely holding the two parts or draw-heads 1 and 2 together.

It may be remarked that when it is desired to uncouple the two cars the pin D is withdrawn from the opening C of the link A, and the said link pushed out of the jaws B B at the rear, and then replaced in the jaws in a reversed position, ready to engage with the jaws of another car.

When a car having my improved coupling device is brought into contact with a car using the hand-link now in use on railroads, the two cars are readily connected or coupled together by passing the old style of link over the upper central part B of the draw-head, as indicated at H, and under the frame in the rear, where it is then secured by the coupling-pin D, passing through the link and the openings E E in the frame.

Having thus described my invention, what I claim as new and useful is—

1. In a car-coupling, the draw-heads A', consisting of the vertical sides and inclined central parts B B having curved edges G G, and provided with the rods I I, and rear frame provided with openings E E and coupling-pin D, in combination with the flat link A having an opening, C, at one end, and springs F at the opposite end, the several parts being constructed, arranged, and combined to operate, substantially as and for the purpose specfied.

2. The flat link A, provided with the opening C at one end and the springs F F F at the opposite end, substantially as and for the purpose described.

3. The combination of the link A, provided with the springs F at one end and the openings C at the opposite end, with the jaws B B of one draw-head and the coupling-pin D of the opposite draw-head, substantially as specified.

JOHN D. ROSS.

Witnesses:
JAMES E. ELLIS,
ALBERT B. ROSS.